United States Patent
Gao et al.

(10) Patent No.: US 12,228,671 B2
(45) Date of Patent: Feb. 18, 2025

(54) SIGNAL TRANSMISSION METHOD AND RELATED APPARATUS

(71) Applicant: HUAWEI TECHNOLOGIES CO., LTD., Guangdong (CN)

(72) Inventors: Lei Gao, Beijing (CN); Sha Ma, Beijing (CN); Sida Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 17/896,709

(22) Filed: Aug. 26, 2022

(65) Prior Publication Data

US 2022/0413087 A1      Dec. 29, 2022

Related U.S. Application Data

(63) Continuation of application No. PCT/CN2021/078326, filed on Feb. 27, 2021.

(30) Foreign Application Priority Data

Feb. 29, 2020   (CN) .......................... 202010134537.2

(51) Int. Cl.
    *G01S 7/00*    (2006.01)
    *G01S 13/93*   (2020.01)
    *G01S 13/931*  (2020.01)

(52) U.S. Cl.
    CPC ............ *G01S 7/003* (2013.01); *G01S 13/931* (2013.01)

(58) Field of Classification Search
    CPC .............................. G01S 7/003; G01S 13/931

USPC .......................................................... 342/399
See application file for complete search history.

(56) References Cited

U.S. PATENT DOCUMENTS

| 4,896,116 | A  |   | 1/1990 | Nagashima et al. |
|---|---|---|---|---|
| 11,871,298 | B2 | * | 1/2024 | Hayes ..................... H04W 4/44 |
| 2013/0169468 | A1 | * | 7/2013 | Johnson .................. G01S 13/34 342/41 |
| 2019/0023270 | A1 | * | 1/2019 | Hayashi .............. B60W 30/085 |

FOREIGN PATENT DOCUMENTS

| CN | 1913371 A | 2/2007 |
|---|---|---|
| CN | 102713667 A | 10/2012 |
| CN | 104076328 A | 10/2014 |
| CN | 108123782 A | 6/2018 |

(Continued)

OTHER PUBLICATIONS

Extended European Search Report in European Appln No. 21760116.0, dated Jul. 6, 2023, 10 pages.

(Continued)

*Primary Examiner* — Harry K Liu
(74) *Attorney, Agent, or Firm* — Fish & Richardson P.C.

(57) ABSTRACT

Example signal transmission methods, apparatuses, systems, and computer storage media are disclosed. One example method includes obtaining, by a first detection apparatus, a first moment, where the first moment is a start moment of a first time unit, and the first time unit is used for the first detection apparatus to send a first signal. The first signal is sent by the first detection apparatus based on a first periodicity, where the first signal is used to indicate sending resource information of a detection signal, and the first time unit is further used for a second detection apparatus to receive the first signal.

21 Claims, 5 Drawing Sheets

(56) References Cited

FOREIGN PATENT DOCUMENTS

| CN | 109932691 A | 6/2019 |
| CN | 110418310 A | 11/2019 |
| CN | 110488263 A | 11/2019 |
| DE | 102017216435 A1 | 3/2019 |
| EP | 1826586 A1 | 8/2007 |
| EP | 3509344 A1 | 7/2019 |
| EP | 3629639 A1 * | 4/2020 ........ H04W 56/0015 |
| JP | 2008232642 A | 10/2008 |
| WO | 2019205724 A1 | 10/2019 |

OTHER PUBLICATIONS

PCT International Search Report and Written Opinion issued in International Application No. PCT/CN2021/078326 on May 28, 2021, 18 pages (with English translation).

Office Action in Indian Appln. No. 202227049966, dated Mar. 31, 2023, 6 pages (with English translation).

* cited by examiner

SIGNAL TRANSMISSION METHOD AND RELATED APPARATUS

CROSS-REFERENCE TO RELATED APPLICATIONS

This application is a continuation of International Application No. PCT/CN2021/078326, filed on Feb. 27, 2021, which claims priority to Chinese Patent Application No. 202010134537.2, filed on Feb. 29, 2020. The disclosures of the aforementioned applications are hereby incorporated by reference in their entireties.

TECHNICAL FIELD

This application relates to the sensor field, and in particular, to a signal transmission method and a related apparatus.

BACKGROUND

With the development of society, increasingly more machines in the modern life develop towards automation and intelligentization, and a vehicle used for mobile traveling is no exception. An intelligent vehicle is entering daily lives of people. In recent years, an advanced driving assistant system (Advanced Driving Assistant System, ADAS) plays an important role in the intelligent vehicle. This system uses various sensors installed on the vehicle to sense an ambient environment, collect data, and identify, detect, and trace a still object and a moving object in a driving process of the vehicle, and performs a system operation and system analysis with reference to map data of a navigator, so that a driver can be aware of a possible danger in advance, to effectively increase driving comfort and safety of the vehicle.

In an unmanned driving architecture, a sensor layer includes a vision sensor such as a vehicle-mounted camera and a radar sensor such as a vehicle-mounted millimeter-wave radar, a vehicle-mounted laser radar, and a vehicle-mounted ultrasonic radar. The millimeter-wave radar becomes a main sensor of an unmanned driving system because of low costs and a mature technology. Currently, more than 10 functions have been developed for the ADAS, including adaptive cruise control (Adaptive Cruise Control, ACC), autonomous emergency braking (Autonomous Emergency Braking, AEB), lane change assist (Lane Change Assist, LCA), and blind spot monitoring (Blind Spot Monitoring, BSD). All these functions rely on the vehicle-mounted millimeter-wave radar. A millimeter wave is an electromagnetic wave with a wavelength of 1 mm to 10 mm, and a corresponding frequency range is 30 GHz to 300 GHz. In this frequency band, millimeter wave-related features are very suitable for use in the vehicle-mounted field. For example, a high bandwidth means abundant frequency domain resources and a low antenna side lobe, thereby facilitating imaging or quasi-imaging. A short wavelength means a reduced size of a radar device and a reduced antenna diameter, and therefore a weight is reduced. A narrow beam means that in the case of a same antenna size, a millimeter-wave beam is much narrower than a micrometer-wave beam, and therefore radar resolution is high. Strong penetration means that compared with laser radar and an optical system, the millimeter-wave radar has a better capability of penetrating smoke, dust, and fog, and can work around the clock.

With widespread use of vehicle-mounted radars, mutual interference between vehicles in which the vehicle-mounted radars are located becomes increasingly severe. Mutual interference reduces a detection probability of the vehicle-mounted radar or improves a false alarm (Ghost) probability of the vehicle-mounted radar, which poses non-negligible impact on driving safety and comfort of a vehicle. On a basis of this, how to reduce interference between the vehicle-mounted radars is a technical problem that needs to be resolved urgently.

SUMMARY

Embodiments of this application provide a signal transmission method and a related apparatus, which may be applied to a sensor, especially in the radar field, and in particular, relate to a cooperative radar. The method is used by the radar to perform cooperation through communication, to reduce mutual interference between radars. When a detection signal is sent, a first signal used to indicate sending resource information of the detection signal may be sent in a first time unit. A second detection apparatus may receive the first signal in the first time unit, so that the second detection apparatus can select channels that do not interfere with each other to send the detection signal, which improves performance when detecting a target.

According to a first aspect, an embodiment of this application provides a signal transmission method, applied to a first detection apparatus, where the method includes:

obtaining a first moment, where the first moment is a start moment of a first time unit, and the first time unit is used for the first detection apparatus to send a first signal; and sending the first signal based on a first periodicity, where the first signal is used to indicate sending resource information of a detection signal.

The first time unit is further used for a second detection apparatus to receive the first signal.

In this embodiment of this application, the first signal is sent in the first time unit based on the first periodicity. The first time unit is further used for the second detection apparatus to receive the first signal, and the first signal is used to indicate the sending resource information of the detection signal. The first detection apparatus may notify, by using the first signal, the second detection apparatus that the first detection apparatus sends a sending resource of the detection signal. The second detection apparatus may select a resource for the detection signal of the second detection apparatus based on the sending resource for the detection signal of the first detection apparatus. Therefore, interference between different detection apparatuses during target detection is reduced, and performance of the detection apparatus during target detection is improved. The foregoing method is used to implement cooperation between the detection apparatuses through communication, thereby avoiding or mitigating mutual interference.

With reference to the first aspect, in a possible embodiment, the first periodicity is a positive integer multiple of a periodicity in which the first detection apparatus sends the detection signal.

In this example, the first periodicity is an integer multiple of the periodicity of the detection signal, so that it can be easily implemented that a sense dedicated signal and the detection signal are sent at different time. This can reduce implementation complexity, and improve convenience when the detection apparatus sends the first signal.

With reference to the first aspect, in a possible embodiment, the first periodicity is also a periodicity in which the second detection apparatus receives the first signal.

In this example, the second detection apparatus may receive the first signal in each first periodicity.

With reference to the first aspect, in a possible embodiment, the first periodicity is a common multiple of a second periodicity and a third periodicity. The second periodicity is a periodicity in which the first detection apparatus sends the detection signal, and the third periodicity is a periodicity in which the second detection apparatus sends the detection signal.

In this example, the first periodicity is a common multiple of the second periodicity and the third periodicity, so that it can be easily implemented that time for the second detection apparatus to sense the first signal is different from time for the second detection apparatus to send the detection signal. This ensures that the second detection apparatus can sense the first signal, and improves stability when the second detection apparatus detects the first signal.

With reference to the first aspect, in a possible embodiment, the first detection apparatus sends the first signal in a second time unit. The second time unit is included in the first time unit.

With reference to the first aspect, in a possible embodiment, the first time unit does not overlap a time unit in which the first detection apparatus sends the detection signal.

In this example, the first time unit does not overlap the time unit for sending the detection signal. This can avoid giving up sending a signal due to resource overlapping occupation during signal sending, and improve reliability during signal sending.

With reference to the first aspect, in a possible embodiment, if a sending resource of the first signal overlaps the sending resource of the detection signal, the first detection apparatus sends the first signal, and the first detection apparatus does not send the detection signal.

Alternatively, when a random number generated by the first detection apparatus is greater than a preset value, the first detection apparatus sends the first signal, and the first detection apparatus does not send the detection signal.

With reference to the first aspect, in a possible embodiment, the sending resource information includes time domain resource information and/or frequency domain resource information.

With reference to the first aspect, in a possible embodiment, the sending resource information includes waveform type information and/or waveform-related parameter information of the detection signal.

According to a second aspect, an embodiment of this application provides a detection apparatus. The apparatus includes a processor and a transceiver.

The processor is configured to obtain a first moment. The first moment is a start moment of a first time unit, and the first time unit is used for the transceiver to send a first signal.

The transceiver is configured to send the first signal based on a first periodicity. The first signal is used to indicate sending resource information of a detection signal.

The first time unit is further used for a second detection apparatus to receive the first signal.

With reference to the second aspect, in a possible embodiment, the first periodicity is a positive integer multiple of a periodicity in which the first detection apparatus sends the detection signal.

With reference to the second aspect, in a possible embodiment, the first periodicity is also a periodicity in which the second detection apparatus receives the first signal.

With reference to the second aspect, in a possible embodiment, the first periodicity is a common multiple of a second periodicity and a third periodicity. The second periodicity is a periodicity in which the transceiver sends the detection signal, and the third periodicity is a periodicity in which the second detection apparatus sends the detection signal.

With reference to the second aspect, in a possible embodiment, the transceiver sends the first signal in a second time unit. The second time unit is included in the first time unit.

With reference to the second aspect, in a possible embodiment, the first time unit does not overlap a time unit in which the transceiver sends the detection signal.

With reference to the second aspect, in a possible embodiment, if a sending resource of the first signal overlaps a sending resource of the detection signal, the transceiver sends the first signal, and the transceiver does not send the detection signal.

Alternatively, when a random number generated by the processor is greater than a preset value, the transceiver sends the first signal, and the transceiver does not send the detection signal.

According to a third aspect, an embodiment of this application provides a chip system. The chip system includes a processor, configured to support a detection apparatus in implementing the method according to any one of the implementations of the first aspect.

According to a fourth aspect, an embodiment of this application provides a computer-readable storage medium. The computer-readable storage medium stores a computer program, the computer program includes program instructions, and when the program instructions are executed by a processor, the processor is enabled to perform the method according to any one of the implementations of the first aspect.

These aspects or other aspects of this application are clearer and more comprehensible in descriptions of the following embodiments.

BRIEF DESCRIPTION OF DRAWINGS

To describe the technical solutions in embodiments of this application or in the conventional technology more clearly, the following briefly describes the accompanying drawings for describing embodiments or the conventional technology. It is clearly that the accompanying drawings in the following description show some embodiments of this application, and a person of ordinary skill in the art may still derive other drawings from these accompanying drawings without creative efforts.

DESCRIPTION OF EMBODIMENTS

The following describes embodiments of this application with reference to accompanying drawings.

First, target detection performed by a radar is described. A first detection apparatus and a second detection apparatus according to embodiments of this application may be radars. The first detection apparatus and the second detection apparatus are merely used to distinguish between radars, and are not limited to specific radars. The first detection apparatus and the second detection apparatus may be cooperative radars or the like.

Figure 1:
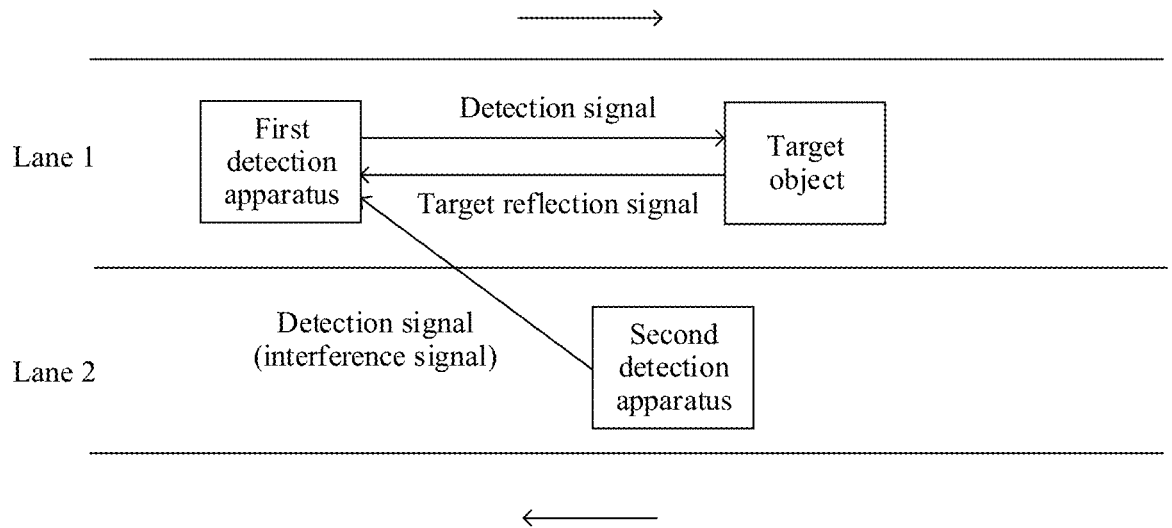
FIG. 1 is a schematic diagram of sending and receiving a detection signal by a radar according to an embodiment of this application.

As shown in FIG. 1, a vehicle on which the first detection apparatus is located runs on a lane 1, and a vehicle on which the second detection apparatus is located runs on a lane 2. The lane 1 and the lane 2 are lanes close to each other. The lanes close to each other may be understood as other lanes on a same road, and may be adjacent lanes or may be non-adjacent lanes. The first detection apparatus sends a detection signal by using a resource that is constant in frequency domain and that is periodic in time domain. After the detection signal is reflected by a target object, the first detection apparatus receives the reflected detection signal (a target reflection signal). The first detection apparatus completes target detection based on at least one of signal strength of the target reflection signal, a signal transmission delay, a Doppler frequency of the signal, and a direction in which a wave vector is received, and based on at least one of: existence of the target object, RCS, a distance, speed (accurately, a projection component of a relative speed (vector) on a connection line between the first detection apparatus and the target object), and angle relative to the first detection apparatus, and the like that are determined based on the foregoing parameters.

Because the first detection apparatus also receives the detection signal (an interference signal) sent by the second detection apparatus, when a sending resource of the detection signal sent by the second detection apparatus partially or completely overlaps a sending resource of the detection signal sent by the first detection apparatus, a signal for target detection (detection of existence, a distance, a speed, an angle, and the like of the target) received by the first detection apparatus may include both the target reflection signal and the detection signal (the interference signal) that is sent by the second detection apparatus. In this case, the detection signal sent by the second detection apparatus causes interference to the first detection apparatus, and affects detection of the target object by the first detection apparatus. Possible impact includes: increasing noise floor during target detection performed by the first detection apparatus, which decreases a capability of the first detection apparatus to detect a weak target and decreases target detection precision; forming a pseudo target; and the like. Therefore, how to reduce mutual interference between radars is a problem that needs to be resolved.

Embodiments of this application are intended to resolve a problem that mutual interference is caused between the detection apparatuses during target detection, so that a first detection apparatus is used to send a detection signal. The first detection apparatus obtains a first moment (a start moment of a first time unit), and the first time unit is used for the first detection apparatus to send a sense dedicated signal. The first detection apparatus sends the sense dedicated signal based on a first periodicity, and the sense dedicated signal is used to indicate sending resource information of the detection signal. The second detection apparatus receives the sense dedicated signal in the first time unit. After receiving the sense dedicated signal, the second detection apparatus determines, by using the received sense dedicated signal, sending resource information of a detection signal sent by the second detection apparatus. This can reduce mutual interference between the detection apparatuses during detection signal sending, and can improve accuracy during target detection performed by the detection apparatuses.

Embodiments of this application provide a signal transmission method and a related device, which may be applied to a sensor, especially in the radar field, and in particular, relate to a cooperative radar. The method is used by the radar to perform cooperation through communication, to reduce mutual interference between radars, and improve accuracy during target detection performed by the radar.

Figure 2:
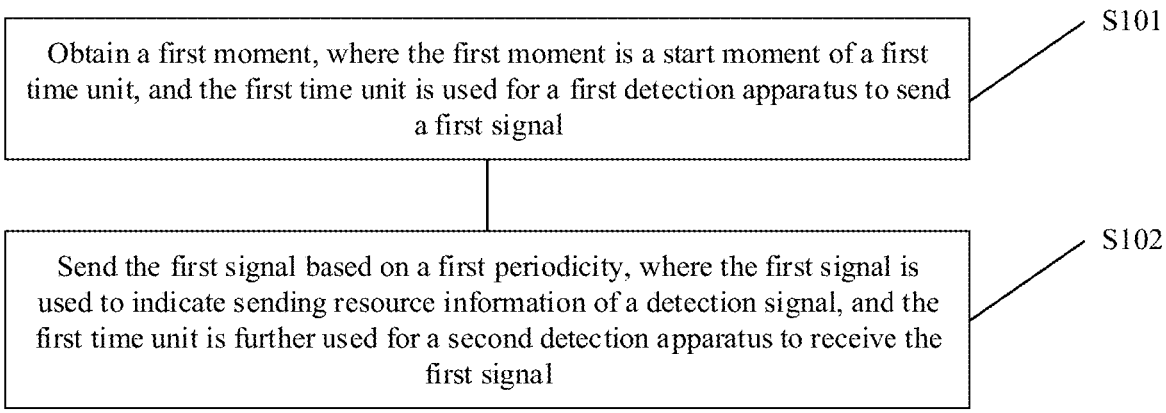
FIG. 2 is a schematic flowchart of a signal transmission method according to an embodiment of this application.

FIG. 2 is a schematic flowchart of a signal transmission method according to an embodiment of this application. The signal transmission method provided in this embodiment of this application is applied to a first detection apparatus. A first signal may be the sense dedicated signal in the foregoing embodiments. The method includes the following steps.

S101: The first detection apparatus obtains a first moment, where the first moment is a start moment of a first time unit, and the first time unit is used for the first detection apparatus to send the first signal.

The start moment of the first time unit is a moment M times the first periodicity from a zero moment of system time, where M is a natural number. For example, if the first periodicity is 200 ms, the start moment of the first time unit may be a moment 200 ms from the zero moment of the system time, a moment 400 ms from the zero moment of the system time, or the like. The system time may be understood as time followed by both the first detection apparatus and a second detection apparatus. The time may be natural time or customized time.

The first detection apparatus may send the first signal in a part or all of the time in the first time unit.

S102: The first detection apparatus sends the first signal based on the first periodicity, where the first signal is used to indicate sending resource information of a detection signal, and the first time unit is further used for the second detection apparatus to receive the first signal.

The sending resource information includes time domain resource information, frequency domain resource information, and the like, and may further include information such as waveform information and/or waveform-related parameter information used for detecting a channel.

The second detection apparatus may receive the first signal in a part or all of the time in the first time unit.

In a possible embodiment, the first signal is used to indicate the sending resource information of the detection signal. To be specific, the first signal may indicate the sending resource information of the detection signal by using a time domain resource and/or a frequency domain resource of the first signal. In this way, an amount of information included in indication information in the sense dedicated signal can be reduced, to improve reliability during obtaining the sending resource information of the detection signal by using the first signal.

In a possible embodiment, the first signal may also indicate the sending resource information of the detection signal by using the indication information carried in the sense dedicated signal. The indication information includes at least one of information about a frequency domain resource and/or a time domain resource occupied by the detection signal and information about a frequency domain resource and/or a time domain resource not occupied by the detection signal. The indication information may further include at least one of the following: start moment information, sending periodicity information, frequency resource information, and the like of a second signal. The indication information may further include waveform type information and/or waveform-related parameter information of the detection signal, and the like. Certainly, the first signal may further indicate the resource information not occupied by the detection signal, which is specifically the same as the resource information occupied by the detection signal. Details are not described herein again.

Figure 3:
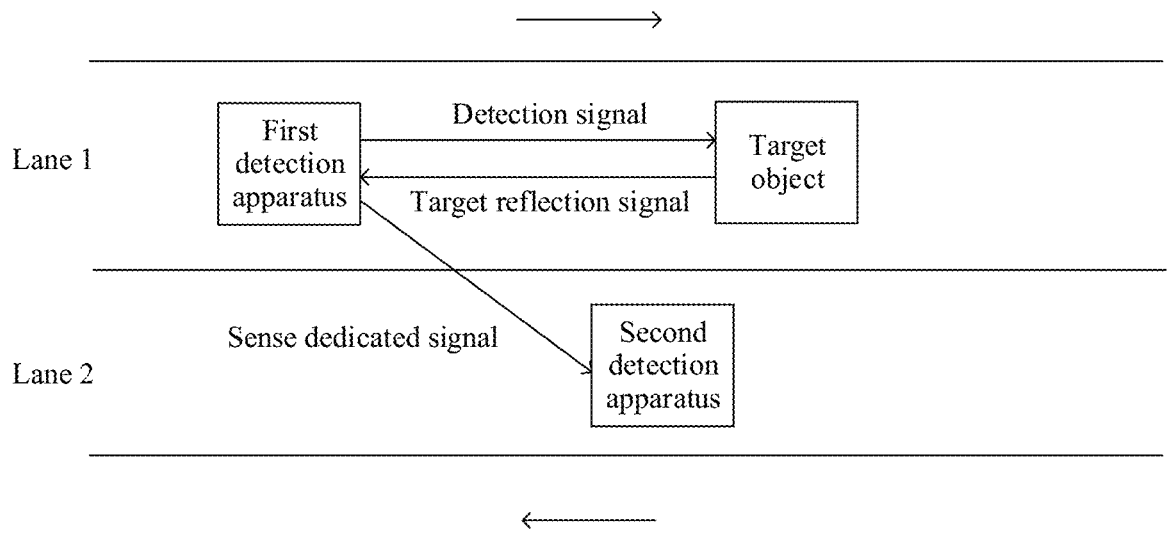
FIG. 3 is a schematic diagram of sending a detection signal and a sense dedicated signal by a radar according to an embodiment of this application.

In a possible embodiment, FIG. 3 is a schematic diagram of sending a first signal by a first detection apparatus. An example in which the first signal is a sense dedicated signal is used for description. The first detection apparatus sends a detection signal and a sense dedicated signal, and a function of the sense dedicated signal is to indicate sending resource information of the detection signal sent by the first detection apparatus.

Figure 4:
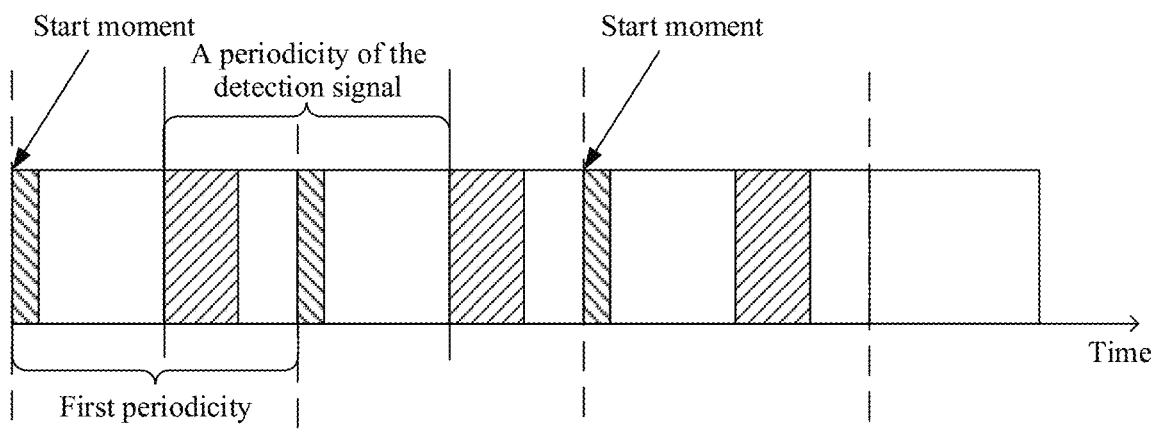
FIG. 4 is a schematic diagram of a sending periodicity of a sense dedicated signal according to an embodiment of this application.

In a possible embodiment, FIG. 4 is a schematic diagram of a sending periodicity (a first periodicity) of a sense dedicated signal. A first detection apparatus sends at least one sense dedicated signal in a first time unit, and the first detection apparatus may also receive a sense dedicated signal sent by at least one other radar in the first time unit. The first detection apparatus sends a sense dedicated signal based on a first periodicity, where the first periodicity may be a positive integer multiple of a periodicity in which the first detection apparatus sends the detection signal. In FIG. 4, an example in which the first periodicity is the same as the periodicity of the detection signal is used for description. Certainly, the first periodicity may also be another positive integer multiple of the periodicity of the detection signal. For example, the sense dedicated signal is sent every other periodicity of the detection signal (the first periodicity is twice the periodicity of the detection signal). This is merely an example for description herein, and is not specifically limited herein.

In a possible embodiment, the first detection apparatus sends the sense dedicated signal in a second time unit, where the second time unit is included in the first time unit. For example, the first time unit is divided into N time subunits, and the second time unit is K consecutive time subunits in the N time subunits, where N and K are positive integers. Certainly, the K time subunits may also be inconsecutive. This is not specifically limited in this application. Therefore, when receiving the sense dedicated signal sent by the first detection apparatus, the second detection apparatus needs to receive the sense dedicated signal in the second time unit, to ensure that the sense dedicated signal sent by the first detection apparatus can be sensed by the second detection apparatus. In addition, the first periodicity is an integer multiple of the periodicity of the detection signal, so that it can be easily implemented that the sense dedicated signal and the detection signal are sent at different time. This can reduce implementation complexity, and improve convenience when a detection apparatus sends a first signal.

In a possible embodiment, the first detection apparatus may also send a plurality of sense dedicated signals in the first time unit, and each sense dedicated signal is sent based on the first periodicity. In this case, the second detection apparatus may also sense the plurality of sense dedicated signals in the first time unit.

Figure 5:
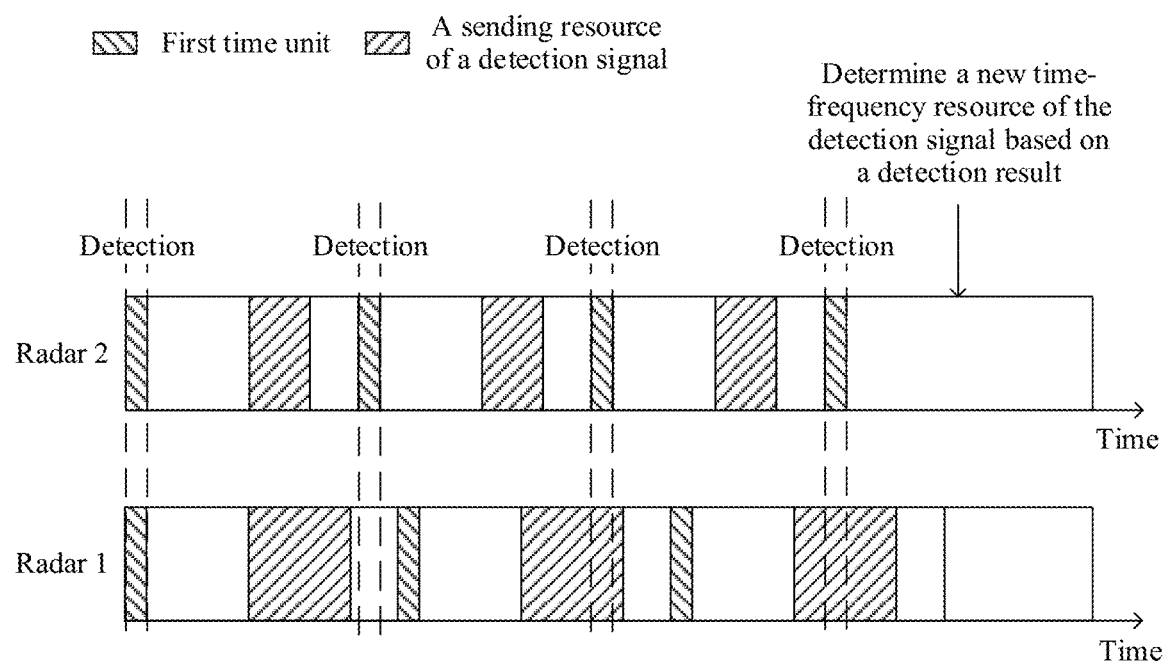
FIG. 5 is a schematic diagram of detecting a sense dedicated signal by a radar according to an embodiment of this application.

In a possible embodiment, as shown in FIG. 5, a second detection apparatus receives, in a first time unit, a sense dedicated signal sent by a first detection apparatus. In this case, after receiving the sense dedicated signal sent by the first detection apparatus for the first time, the second detection apparatus may further receive, after a specified periodicity, the sense dedicated signal sent by the first detection apparatus. The periodicity is a common multiple of a periodicity in which the second detection apparatus detects the sense dedicated signal and a periodicity in which the first detection apparatus sends the sense dedicated signal. Because there must be a common multiple of the two periodicities, the second detection apparatus can definitely receive the sense dedicated signal sent by the first detection apparatus again. The periodicity in which the second detection apparatus detects the sense dedicated signal may be the same as the periodicity in which the second detection apparatus sends the detection signal. Certainly, the periodicity in which the second detection apparatus detects the sense dedicated signal may also be different from the periodicity in which the second detection apparatus sends the detection signal. This is not specifically limited herein. After receiving the first signal, the second detection apparatus re-determines sending resource information of the detection signal based on the sending resource information indicated by the first signal. When re-determining the sending resource information of the detection signal, the second detection apparatus may select a part or all of resource information other than the sending resource information indicated by the sense dedicated signal as the sending resource information of the detection signal of the second detection apparatus. Certainly, if the first detection apparatus sends a plurality of sense dedicated signals in the first time unit, the second detection apparatus may also receive the plurality of sense dedicated signals in the first time unit, and re-determine sending resource information of the detection signal based on sending resource information of another detection apparatus indicated by the plurality of sense dedicated signals.

In a possible embodiment, the second detection apparatus may send the sense dedicated signal, or may not send the sense dedicated signal. This is not limited in this application.

Figure 6:
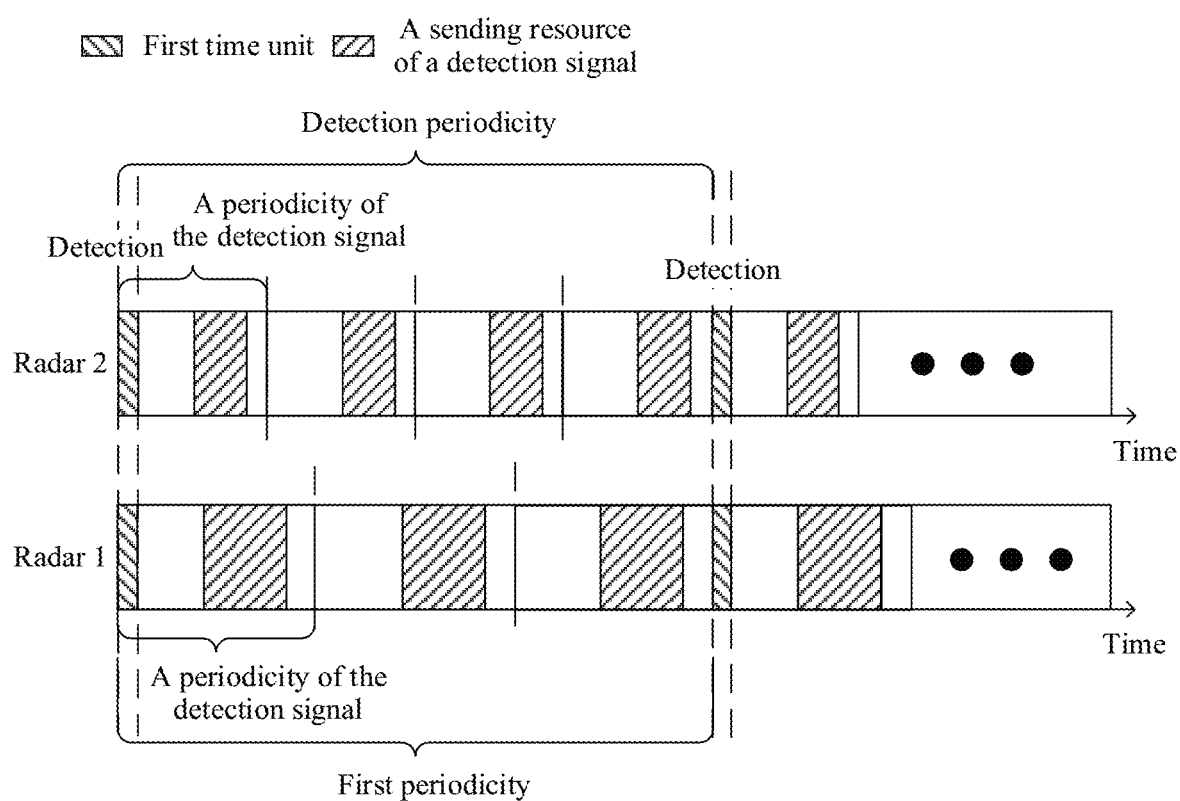
FIG. 6 is a schematic diagram of another sending periodicity of a sense dedicated signal according to an embodiment of this application.

FIG. 6 is a schematic diagram of another sending periodicity (a first periodicity) of a sense dedicated signal. The first periodicity is a common multiple of a second periodicity and a third periodicity. The second periodicity is a periodicity in which the first detection apparatus sends the detection signal, and the third periodicity is a periodicity in which the second detection apparatus sends the detection signal. As shown in FIG. 6, the first periodicity is three times the periodicity in which the first detection apparatus sends the detection signal, and the second periodicity is four times the periodicity in which the second detection apparatus sends the detection signal. This is merely an example for description, and is not specifically limited herein. The first periodicity is a common multiple of the second periodicity and the third periodicity, and the second detection apparatus detects the sense dedicated signal in the first time unit based on the first periodicity. In this way, it can be easily implemented that time for the second detection apparatus to sense the first signal is different from time for the second detection apparatus to send the detection signal. This ensures that the second detection apparatus can sense the first signal, and improves stability when the second detection apparatus detects the first signal. The first detection apparatus may also send the sense dedicated signal in the second time unit. Refer to the specific sending method in the foregoing embodiment. Details are not described herein again. For a specific processing manner after the second detection apparatus receives the sense dedicated signal, refer to the specific method in the foregoing embodiment. Details are not described herein again.

In the foregoing embodiments shown in FIG. 5 and FIG. 6, the sending resource of the sense dedicated signal does not overlap the time unit in which the first detection apparatus sends the detection signal.

In a possible embodiment, the sending resource used by the first detection apparatus to send the sense dedicated signal may also overlap a resource used by the first detection apparatus to send the detection signal. If the first time unit overlaps the time unit in which the first detection apparatus sends the detection signal, the first detection apparatus sends the sense dedicated signal, and the first detection apparatus does not send the detection signal.

Alternatively, if the first time unit overlaps the time unit in which the first detection apparatus sends the detection signal, the first detection apparatus generates a random number. If the random number generated by the first detection apparatus is greater than a preset value, the first detection apparatus sends the sense dedicated signal, and the first detection apparatus does not send the detection signal.

In a possible embodiment, if the first time unit overlaps the time unit in which the first detection apparatus sends the detection signal, the first detection apparatus may further send the sense dedicated signal or the detection signal by using the following method.

The first detection apparatus sends the sense dedicated signal, and the first detection apparatus does not send the detection signal.

Alternatively, the first detection apparatus does not send the sense dedicated signal, and the first detection apparatus sends the detection signal.

Alternatively, when the random number generated by the first detection apparatus is greater than the preset value, the first detection apparatus sends the sense dedicated signal, and the first detection apparatus does not send the detection signal. When the random number generated by the first detection apparatus is less than or equal to the preset value, the first detection apparatus does not send the sense dedicated signal, and the first detection apparatus sends the detection signal.

The first detection apparatus may further sense, in the first time unit, a sense dedicated signal sent by another radar, and the time unit in which the first detection apparatus senses the sense dedicated signal sent by the another radar is a time unit other than the second time unit.

Figure 7:
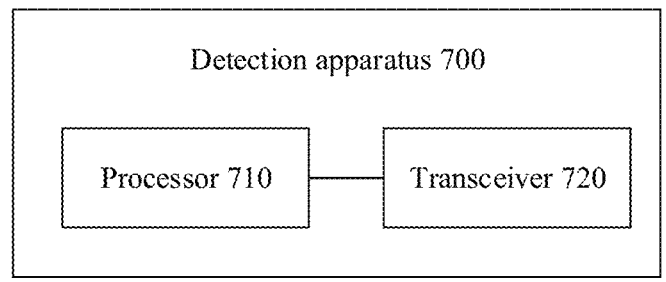
FIG. 7 is a schematic diagram of a structure of a detection apparatus according to an embodiment of this application.

FIG. 7 is a schematic diagram of a structure of a detection apparatus according to an embodiment of this application. A detection apparatus 700 provided in this embodiment of this application includes a processor 710 and a transceiver 720.

The processor 710 is configured to obtain a first moment. The first moment is a start moment of a first time unit, and the first time unit is used for the transceiver to send a first signal.

The transceiver 720 is configured to send the first signal based on a first periodicity. The first signal is used to indicate sending resource information of a detection signal, and the first time unit is further used for a second detection apparatus to receive the first signal.

In a possible embodiment, the first periodicity is a positive integer multiple of a periodicity in which the first detection apparatus sends the detection signal.

In a possible embodiment, the first periodicity is also a periodicity in which the second detection apparatus receives the first signal.

In a possible embodiment, the first periodicity is a common multiple of a second periodicity and a third periodicity. The second periodicity is a periodicity in which the transceiver sends the detection signal, and the third periodicity is a periodicity in which the second detection apparatus sends the detection signal.

In a possible embodiment, the transceiver 720 sends the first signal in a second time unit. The second time unit is included in the first time unit.

In a possible embodiment, the first time unit does not overlap a time unit in which the transceiver 720 sends the detection signal.

In a possible embodiment, if a sending resource of the first signal overlaps a sending resource of the detection signal, the transceiver 720 sends the first signal, and the transceiver does not send the detection signal.

Alternatively, when a random number generated by the processor 710 is greater than a preset value, the transceiver 720 sends the first signal, and the transceiver 720 does not send the detection signal.

Figure 8:
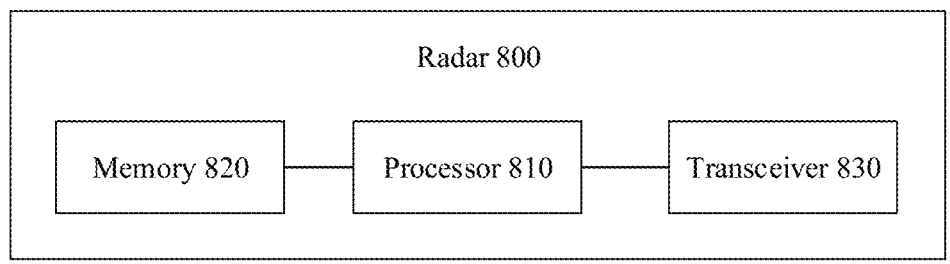
FIG. 8 is a schematic diagram of a structure of a radar according to an embodiment of this application.

As shown in FIG. 8, an embodiment of this application further provides a radar 800. The radar 800 includes a processor 810, a memory 820, and a transceiver 830. The memory 820 stores instructions or a program, and the processor 810 is configured to execute the instructions or the program stored in the memory 820. When the instruction or the program stored in the memory 820 is executed, the processor 810 is configured to perform an operation performed by the processor 710 in the foregoing embodiment, and the transceiver 830 is configured to perform an operation performed by the transceiver 720 in the foregoing embodiment.

Figure 9:
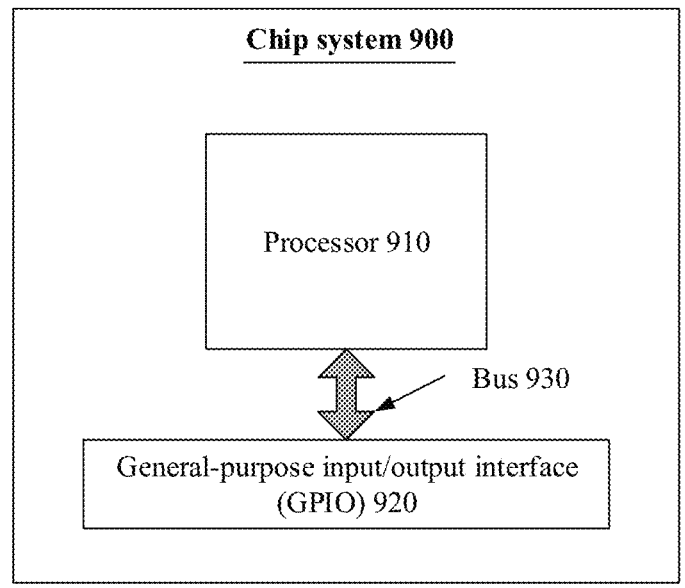
FIG. 9 is a schematic diagram of a structure of a chip system according to this application.

FIG. 9 is a schematic diagram of a structure of a chip system according to this application. As shown in FIG. 9, the chip system 900 may include a processor 910 and one or more interfaces 920 coupled to the processor 910. An example is as follows:

The processor 910 may be configured to: read and execute computer-readable instructions. During specific implementation, the processor 910 may mainly include a controller, an arithmetic unit, and a register. For example, the controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for storing a quantity of register operations, intermediate operation results, and the like that are temporarily stored during instruction execution. During specific implementation, a hardware architecture of the processor 910 may be an application-specific integrated circuit (application specific integrated circuit, ASIC) architecture, a microprocessor without interlocked piped stages (microprocessor without interlocked piped stages architecture, MIPS) architecture, an advanced reduced instruction set computer machines (advanced RISC machines, ARM)

architecture, an NP architecture, or the like. The processor 910 may be a single-core or multi-core processor.

For example, the interface 920 may be configured to input to-be-processed data to the processor 910, and may output a processing result of the processor 810. During specific implementation, the interface 920 may be a general-purpose input/output (general purpose input output, GPIO) interface. The interface 920 is connected to the processor 910 through a bus 930.

In a possible implementation, the processor 910 may be configured to: invoke, from a memory, a program or data for implementation on a detection apparatus side in the signal transmission method provided in one or more embodiments of this application, so that the chip can implement the method shown in FIG. 2 to FIG. 5. The memory may be integrated into the processor 910, or may be coupled to the chip system 900 through the interface 920. In other words, the memory may be a part of the chip system 900, or may be independent of the chip system 900. The interface 920 may be configured to output an execution result of the processor 910. In this application, the interface 920 may be specifically configured to output a decoding result of the processor 910. For the signal transmission method provided in one or more embodiments of this application, refer to the foregoing embodiments. Details are not described herein again.

It should be noted that a function corresponding to each of the processor 910 and the interface 920 may be implemented by using a hardware design, may be implemented by using a software design, or may be implemented by combining software and hardware. This is not limited herein.

It may be further understood that the memory mentioned in embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, another programmable logic device, a transistor logic device, or a discrete hardware component, the memory (a storage module) is integrated into the processor.

An embodiment of this application further provides a computer-readable storage medium. The computer-readable storage medium may store a program. When the program is executed, some or all steps of any signal transmission method recorded in the foregoing method embodiments are performed.

It should be noted that, for brief description, the foregoing method embodiments are each represented as a combination of a series of actions. However, a person skilled in the art should appreciate that this application is not limited to the described order of the actions, because according to this application, some steps may be performed in another order or simultaneously. It should be further appreciated by a person skilled in the art that embodiments described in this specification all belong to example embodiments, and the involved actions and modules are not necessarily required in this application.

In the foregoing embodiments, descriptions of embodiments have respective focuses. For a part that is not described in detail in an embodiment, refer to related descriptions in other embodiments.

In the several embodiments provided in this application, it should be understood that the disclosed apparatus may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable memory. Based on such an understanding, the technical solutions of this application essentially, or the part contributing to the conventional technology, or all or some of the technical solutions may be implemented in the form of a software product. The computer software product is stored in a memory and includes several instructions for instructing a computer device (which may be a personal computer, a server, or a network device) to perform all or some of the steps of the methods in embodiments of this application. The foregoing memory includes any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a read-only memory (English: Read-Only Memory, ROM for short), a random access memory (English: Random Access Memory, RAM for short), a magnetic disk, an optical disc, or the like.

Embodiments of this application are described in detail above. The principle and implementation of this application are described herein through specific examples. The description about embodiments is merely provided to help understand the method and core ideas of this application. In addition, a person of ordinary skill in the art can make variations and modifications to this application in terms of the specific implementations and application scopes according to the ideas of this application. Therefore, the content of specification shall not be construed as a limit to this application.

What is claimed is:

1. A signal transmission method, wherein the method comprises:
   obtaining, by a first detection apparatus, a first moment, wherein the first moment is a start moment of a first time unit, and the first time unit is used for the first detection apparatus to send a first signal; and
   sending, by the first detection apparatus, the first signal based on a first periodicity, wherein:
      the first signal is used to indicate sending resource information of a detection signal,
      the first time unit is further used for a second detection apparatus to receive the first signal,
      the first periodicity is a periodicity in which the second detection apparatus receives the first signal, and
      the first periodicity is a common multiple of a second periodicity and a third periodicity, wherein the second periodicity is a periodicity in which the first detection apparatus sends the detection signal, and the third periodicity is a periodicity in which the second detection apparatus sends a second detection signal.

2. The method according to claim 1, wherein:
   the first periodicity is a positive integer multiple of a periodicity in which the first detection apparatus sends the detection signal.

3. The method according to claim 1, wherein the method further comprises sending, by the first detection apparatus, the first signal in a second time unit, and the second time unit is comprised in the first time unit.

4. The method according to claim 1, wherein the first time unit does not overlap a time unit in which the first detection apparatus sends the detection signal.

5. The method according to claim 1, wherein if a sending resource of the first signal overlaps a sending resource of the detection signal, the method further comprises:
   sending, by the first detection apparatus, the first signal, wherein the detection signal is not sent by the first detection apparatus; or
   when a random number generated by the first detection apparatus is greater than a preset value, sending, by the first detection apparatus, the first signal, wherein the detection signal is not sent by the first detection apparatus.

6. The method according to claim 1, wherein sending, by the first detection apparatus, the first signal based on the first periodicity comprises:
   sending, by the first detection apparatus, the first signal based on the first periodicity and the first moment.

7. The method according to claim 1, further comprising:
   receiving, by the first detection apparatus and during the first time unit, a third signal from the second detection apparatus.

8. An apparatus, comprising:
   one or more processors; and
   a non-transitory computer readable medium storing a program comprising instructions that, when executed by the one or more processors, cause the apparatus to perform operations comprising:
      obtaining, by a first detection apparatus, a first moment, wherein the first moment is a start moment of a first time unit, and the first time unit is used for the first detection apparatus to send a first signal; and
      sending, by the first detection apparatus, the first signal based on a first periodicity, wherein;
         the first signal is used to indicate sending resource information of a detection signal,
         the first time unit is further used for a second detection apparatus to receive the first signal,
         the first periodicity is a periodicity in which the second detection apparatus receives the first signal, and
         the first periodicity is a common multiple of a second periodicity and a third periodicity, wherein the second periodicity is a periodicity in which the first detection apparatus sends the detection signal, and the third periodicity is a periodicity in which the second detection apparatus sends a second detection signal.

9. The apparatus according to claim 8, wherein:
   the first periodicity is a positive integer multiple of a periodicity in which the first detection apparatus sends the detection signal.

10. The apparatus according to claim 8, wherein the operations further comprise sending, by the first detection apparatus, the first signal in a second time unit, and the second time unit is comprised in the first time unit.

11. The apparatus according to claim 8, wherein the first time unit does not overlap a time unit in which the first detection apparatus sends the detection signal.

12. The apparatus according to claim 8, wherein if a sending resource of the first signal overlaps a sending resource of the detection signal, the operations further comprise:
   sending, by the first detection apparatus, the first signal, wherein the detection signal is not sent by the first detection apparatus; or
   when a random number generated by the first detection apparatus is greater than a preset value, sending, by the first detection apparatus, the first signal, wherein the detection signal is not sent by the first detection apparatus.

13. The apparatus according to claim 8, wherein sending, by the first detection apparatus, the first signal based on the first periodicity comprises:
   sending, by the first detection apparatus, the first signal based on the first periodicity and the first moment.

14. The apparatus according to claim 8, wherein the operations further comprise:
   receiving, by the first detection apparatus and during the first time unit, a third signal from the second detection apparatus.

15. A computer storage medium storing one or more instructions executable by a computer system to perform operations comprising:
   obtaining, by a first detection apparatus, a first moment, wherein the first moment is a start moment of a first time unit, and the first time unit is used for the first detection apparatus to send a first signal; and
   sending, by the first detection apparatus, the first signal based on a first periodicity, wherein;
      the first signal is used to indicate sending resource information of a detection signal, the first time unit is further used for a second detection apparatus to receive the first signal, the first periodicity is a periodicity in which the second detection apparatus receives the first signal, and the first periodicity is a common multiple of a second periodicity and a third periodicity, wherein the second periodicity is a periodicity in which the first detection apparatus sends the detection signal, and the third periodicity is a periodicity in which the second detection apparatus sends a second detection signal.

16. The computer storage medium according to claim 15, wherein:

the first periodicity is a positive integer multiple of a periodicity in which the first detection apparatus sends the detection signal.

17. The computer storage medium according to claim 15, wherein the operations further comprise sending, by the first detection apparatus, the first signal in a second time unit, and the second time unit is comprised in the first time unit.

18. The computer storage medium according to claim 15, wherein the first time unit does not overlap a time unit in which the first detection apparatus sends the detection signal.

19. The computer storage medium according to claim 15, wherein if a sending resource of the first signal overlaps a sending resource of the detection signal, the operations further comprise:

sending, by the first detection apparatus, the first signal, wherein the detection signal is not sent by the first detection apparatus; or when a random number generated by the first detection apparatus is greater than a preset value, sending, by the first detection apparatus, the first signal, wherein the detection signal is not sent by the first detection apparatus.

20. The computer storage medium according to claim 15, wherein sending, by the first detection apparatus, the first signal based on the first periodicity comprises:

sending, by the first detection apparatus, the first signal based on the first periodicity and the first moment.

21. The computer storage medium according to claim 15, wherein the operations further comprise:

receiving, by the first detection apparatus and during the first time unit, a third signal from the second detection apparatus.

* * * * *

UNITED STATES PATENT AND TRADEMARK OFFICE
CERTIFICATE OF CORRECTION

PATENT NO. : 12,228,671 B2
APPLICATION NO. : 17/896709
DATED : February 18, 2025
INVENTOR(S) : Lei Gao, Sha Ma and Sida Song Page 1 of 1

It is certified that error appears in the above-identified patent and that said Letters Patent is hereby corrected as shown below:

In the Claims

In Column 14, In Line 10, In Claim 8, delete "wherein;" and insert -- wherein: --.

In Column 14, In Line 65, In Claim 15, delete "wherein;" and insert -- wherein: --.

Signed and Sealed this
Fifteenth Day of July, 2025

Coke Morgan Stewart
*Acting Director of the United States Patent and Trademark Office*